(12) United States Patent
Poulin et al.

(10) Patent No.: US 11,290,179 B1
(45) Date of Patent: Mar. 29, 2022

(54) FAULT LOCATION IN AN OPTICAL FIBER NETWORK

(71) Applicant: ATVENT SOLUTIONS INC., Montréal (CA)

(72) Inventors: Louis Poulin, Westmount (CA); Michael Coutinho Fernandes, LaSalle (CA); Nickolaos Mikedis, Laval (CA)

(*) Notice: Subject to any disclaimer, the term of this patent is extended or adjusted under 35 U.S.C. 154(b) by 0 days.

(21) Appl. No.: 17/473,152

(22) Filed: Sep. 13, 2021

Related U.S. Application Data

(60) Provisional application No. 63/225,847, filed on Jul. 26, 2021.

(51) Int. Cl.
*H04B 10/07* (2013.01)
*H04B 10/071* (2013.01)

(52) U.S. Cl.
CPC .................. *H04B 10/071* (2013.01)

(58) Field of Classification Search
CPC .............. H04B 10/071; H04B 10/0791; H04B 10/07955; H04B 10/40
See application file for complete search history.

(56) References Cited

U.S. PATENT DOCUMENTS

| | | | |
|---|---|---|---|
| 7,289,729 B1 | 10/2007 | Eslambolchi et al. | |
| 7,536,102 B1 | 5/2009 | Huffman et al. | |
| 7,558,212 B2 | 7/2009 | Olinski | |
| 8,095,003 B2 | 1/2012 | Peterson, Jr. | |
| 9,103,746 B2 | 8/2015 | Kaufhold et al. | |
| 9,240,855 B1 * | 1/2016 | Lam | H04J 14/0212 |
| 9,500,767 B2 | 11/2016 | Barfoot et al. | |
| 10,432,302 B1 | 10/2019 | Delgado et al. | |
| 10,567,075 B2 | 2/2020 | Tyagi et al. | |
| 11,070,289 B1 | 7/2021 | Hanson et al. | |
| 11,101,884 B1 * | 8/2021 | Campbell | H04L 41/22 |
| 2004/0015309 A1 | 1/2004 | Swisher et al. | |
| 2018/0006715 A1 * | 1/2018 | Tyagi | H04B 10/0791 |
| 2020/0124735 A1 | 4/2020 | Huang et al. | |
| 2020/0191613 A1 * | 6/2020 | Englund | G01H 9/002 |
| 2021/0003474 A1 | 1/2021 | Koshikiya et al. | |
| 2021/0376923 A1 * | 12/2021 | Swinkels | H04Q 11/0066 |

FOREIGN PATENT DOCUMENTS

| | | |
|---|---|---|
| CN | 108123751 B | 6/2018 |
| CN | 108322254 A | 7/2018 |
| CN | 108680192 B | 10/2018 |
| CN | 108696313 A | 10/2018 |
| CN | 108880667 A | 11/2018 |
| CN | 109347547 A | 2/2019 |
| CN | 111082855 A | 4/2020 |
| CN | 111884713 A | 11/2020 |
| WO | 2011/070404 A1 | 6/2011 |

* cited by examiner

*Primary Examiner* — Dzung D Tran
(74) *Attorney, Agent, or Firm* — Anglehart et al.

(57) ABSTRACT

An optical fiber cable monitoring method and an optical fiber cable monitoring system are able to link information obtained from a measurement result with information stored in a database containing an erroneous entry while still identifying a signal loss event location in an optical fiber cable. The optical fiber cable monitoring method can use an automated algorithm to identify the network element corresponding to the loss event of the optical measurement (OTDR). Thus, an operator can recognize an actual location of a fault that is linked to a location of a point of abnormality on the optical fiber cable when an abnormality in the network is detected.

16 Claims, 6 Drawing Sheets

FAULT LOCATION IN AN OPTICAL FIBER NETWORK

This application claims priority to U.S. provisional patent application Ser. No. 63/225,847, filed on Jul. 26, 2021, the contents of which are hereby incorporated by reference.

TECHNICAL FIELD

The present patent application relates to remote location of optical fiber network faults with optical time-domain reflectometer.

BACKGROUND

The optical fibers of telecommunication networks are installed over long distances in a branching arrangement with a plurality of segments connected at junctions with couplers, connectors or splices. Installation of these segments is performed by the telecommunications company employees that are not only responsible for laying out the optical fiber (OF) and connecting the various segments together but, in many cases, are also responsible for the data entry of the lengths of these segments in the network database (DB) along with GPS coordinates of locations of junctions. Therefore, in addition to smaller deviations from the real values (gaps), it is not uncommon to see major sporadic database errors made by the employee through data entry error(s) when installing the optical fiber network segments. Though only some of the gaps constitute considerable deviations from the real lengths, the cumulation of all the smallest gaps, a few more significant errors and one or more major database entry errors can cause the database, and the geographic information system (GIS) based on it, to significantly deviate from the real network specifications.

When the OF network segment fails, it may be a partial loss of signal at a junction that reduces data throughput, or it can be a rupture at a junction or anywhere along the cable that prevents further transmission. In either case, a service call is made to find and repair the OF network segment when one of these faults is detected.

The optical time-domain reflectometry (OTDR) measurement method is a technique for finding a distribution of losses along an optical fiber by measuring reflected light and backward-scattered light over the length of the OF generated within the OF by an optical pulse that is propagated from one end. When junctions are well installed and in very good condition, OTDR equipment may not see each junction, but only the gradual loss along the line. When a junction introduces non-negligible loss, an event appears in the OTDR data as a distinguishable signal loss. The end of the OF segment or a cut of the segment shows as the final loss in the OTDR data. Thus, OTDR may not be used to identify every element of an OF span since only significant signal losses can be identified. The optical fiber cable is installed over a long distance such as several kilometers or more, which makes remote monitoring necessary, and the monitoring is performed by remotely finding a state, particularly a distribution of loss, by using the OTDR measurement method.

Since OTDR data provides a distance along the fiber to an event, to find an event location, the maintenance team needs the data recorded from the time of installation about the length of OF between junctions in the corresponding GIS. In the event of a significant signal loss attributed to the state of the OF network, the process of narrowing down the most likely location to send the maintenance team to locate the source of a signal loss occurrence (fault) site with an OTDR measurement can be laborious and/or costly with the current locating techniques when the GIS data is erroneous. When the real length to an event measured with OTDR does not match the GIS data for a junction, the maintenance or repair team can be at a loss. Whether the event is located underground or along a utility pole line away from a junction, or whether the GIS data is erroneous and the event is located at a junction (and if so, which one) is not easy to resolve. Many hours of searching, probing and investigating hard-to-access locations may be required to locate the fault before initiating repairs during which service to subscribers remains compromised.

SUMMARY

The applicant has developed a method for locating the source of an abnormality by determining the position of an OTDR signal loss occurrence or event in the optical fiber span when there is an error in the GIS or database (DB) data. The method for identifying a location of a reflection event in an optical fiber span may comprise accessing database data representing lengths of optical fiber segments separated by junctions forming the optical fiber span, accessing optical time-domain reflectometry measurement data of the optical fiber span comprising a plurality of signal loss events fewer than a number of the optical fiber junctions, where the events are corresponding to the junctions. Completing a first match of the events with their nearest junction (initial matching) and a second iterative matching with an algorithm for optimizing the initial matching by choosing the best matching solutions out of a multitude of proposed alternative solutions (matching optimization). Using the optimal solution to output the correct lengths of segments corrected with the solution's gaps and the position of one or more events.

The applicant's method is particularly efficient and useful when working with a database and GIS comprising one or more considerable erroneous segment lengths values between network elements (junctions) which can often be attributed to data entry error from the installation or maintenance team employees that are susceptible to generate major discrepancies with the actual real lengths. This data entry error for the length of one segment can be significant enough to require a correction gap greater than either this erroneous segment or the following segment. In other words, a data entry error in one of the lengths of an optical fiber segment can be adjusted to a position beyond one of the two nearest neighboring junctions. In fact, an employee making a database entry typo by interchanging the numbers (290 meters instead of 920 meters, for example) or entering the length for the wrong segment are the most significant errors present in most of the network databases.

Some embodiments can investigate/process a plurality of possible alternative spans (up to one for each possible network branch), one after the other, using the previously described method before selecting the span that best matches the OTDR measurement (the span with the smallest total of gaps or best fitness) when the span corresponding to the OTDR trace cannot be confidently identified using a cryptic or incomplete or erroneous database data.

In the case of some embodiments when the gap is large and is too significant to allow for a coherent initial matching, the distance between OTDR events and each of the network elements (junctions) is calculated and these distances are compared for each of the events to try to match at least a pair of them. When a match (identification of two similar event/junction distances) is complete, this distance is used as a first gap to use in the matching optimization step to accelerate the identification of the optimal solution.

In some embodiments, the optical time-domain reflectometry measurement data comprises a complete loss of signal induced by a cut on one of the optical fiber segments of the span before the termination of the optical fiber span.

Some embodiments use the gaps to correct and update the database data.

Some embodiments save the gaps as metadata to correct and update the database data values when using the corresponding segments and spans.

Some embodiments can display the most likely position of an OF point of abnormality (fault) on a map of the region. Some embodiments can also display the nearby network GIS on that map.

Some embodiments can use various OTDR measurements of alternative network branches comprising at least the span of the event corresponding to the fault, where the various measurements are used to match one or more additional trace events to correct the length of the span comprising the event of interest and/or narrow down the position the fault.

A computer program can be used to process and execute the method here described with any device comprising a processor and a readable memory device with access to the data.

An optical fiber cable monitoring method and an optical fiber cable monitoring system are able to link information obtained from a measurement result with information stored in a database containing an erroneous entry while still identifying a signal loss event location in an optical fiber cable. The optical fiber cable monitoring method can use an automated algorithm to identify the network element corresponding to the loss event of the optical measurement (OTDR). Thus, an operator can recognize an actual location of a fault that is linked to a location of a point of abnormality on the optical fiber cable when an abnormality in the network is detected.

The applicant has developed a method for correcting database data of an optical fiber span with an OTDR measurement in the optical fiber span when there is an error in the GIS or DB data. The method for correcting database data of an optical fiber span may comprise accessing database data representing lengths of optical fiber segments separated by junctions forming the optical fiber span, accessing optical time-domain reflectometry measurement data of the optical fiber span comprising a plurality of signal loss events fewer than a number of the optical fiber junctions, where the events are corresponding to the junctions. Completing an initial matching and a matching optimization to find the optimal matching solution with the smallest set of gaps. Using the optimal solution's set of gaps to correct the lengths of optical fiber segments in the database data or GIS data.

BRIEF DESCRIPTION OF THE DRAWINGS

The invention will be better understood by way of the following detailed description of embodiments of the invention with reference to the appended drawings, in which.

DETAILED DESCRIPTION

Figure 1:
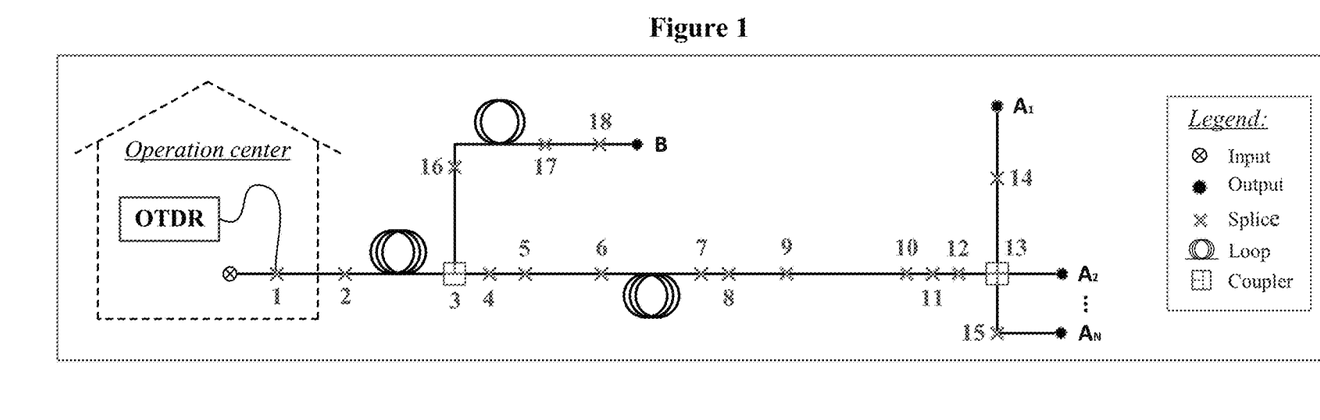
FIG. 1 is a schematic representation of a faulted optical fiber network with several elements (splices, couplers and loops) connecting an operation center to several branches ($A_{1...N}$ and B).

FIG. 1 presents a schematized embodiment of a telecommunication provider's optical fiber network with two principal branches A and B, where a first branch or span A is used to provide multiple subscribers located at the various outputs ($A_1$ to $A_N$). In this embodiment, the network is comprised of various elements (1 to 18) normally present in an optical fiber telecommunication network, such as couplers, loops (extra lengths) and splices joining OF subsegments together, where one of the junctions may be faulty. In telecommunications networks, such a faulty element would affect the quality of the signal, thus affecting the service provided to the subscribers connected to the faulty branch, since the quality of the optical fiber network is greatly dependent on the fiber's integrity. Note that additional various or alternative elements may be included in an OF span.

Figure 2:
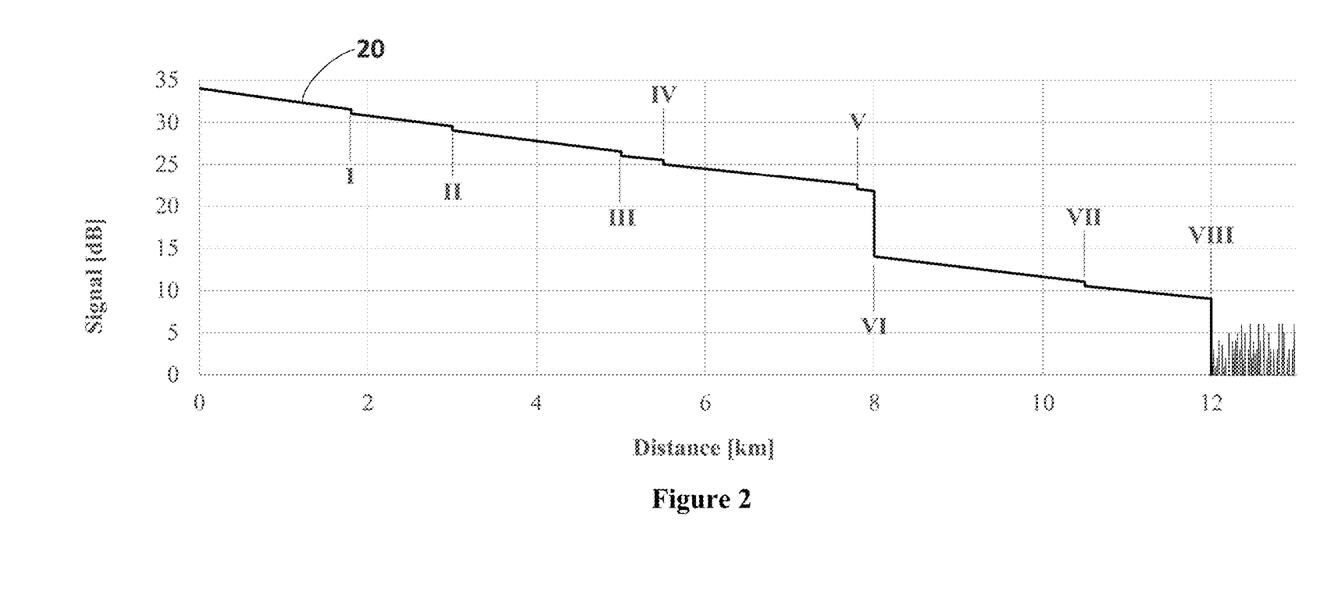
FIG. 2 is a graphic representation illustrating the results of an optical time-domain reflectometry measurement of branch $A_1$ with multiple events of signal loss (I to VII) and the end of the line VIII.

In this embodiment, an OTDR apparatus is connected with an initial splice 1 near the network's input at the provider's operation center of FIG. 1 to measure and record the optical time-domain reflection of the network's branch $A_1$ (from splice 1 to the end $A_1$) comprising fifteen elements (including two couplers and one the end of the optical fiber). The result of this OTDR measurement is illustrated in FIG. 2, where the OTDR trace 20 can be used to identify the punctual significant signal losses (vertical axis), referred to as events, and the distance of optical fiber span separating them to the beginning of the span (horizontal axis). In some embodiments, the OTDR trace is saved or uploaded in a standard sor file format. In this embodiment, eight events (I to VIII) can be identified on the OTDR trace, where one of which is the event of interest corresponding to a major signal loss event VI induced by the faulty splice separated with the reflectometer by eight kilometers of optical fiber. In this embodiment, some of the span's junctions (j) do not provide any measurable or significant signal loss so the events (e) are fewer than the junctions (e<j). Note that the presented method can also be used to correct the database data and GIS with an event for each of the junctions (e=j), even if it is most useful in the previous embodiment (when e<j). Furthermore, in some embodiments, the OTDR trace ends with a complete loss of signal that is induced by a complete cut of one of the optical fiber span's segments prior to the span termination that may or may not corresponds to a junction, which can be confused with a fiber end reflection when first looking at that OTDR trace (false fiber end reflection). In this case, the matching of events is completed in order to identify the correct position of the junction corresponding to the event prior to the false fiber end reflection. Once the optimization of the solution is completed, this event can be used as a reference point to locate and indicate the most likely position of the optical fiber cut.

Figure 3:
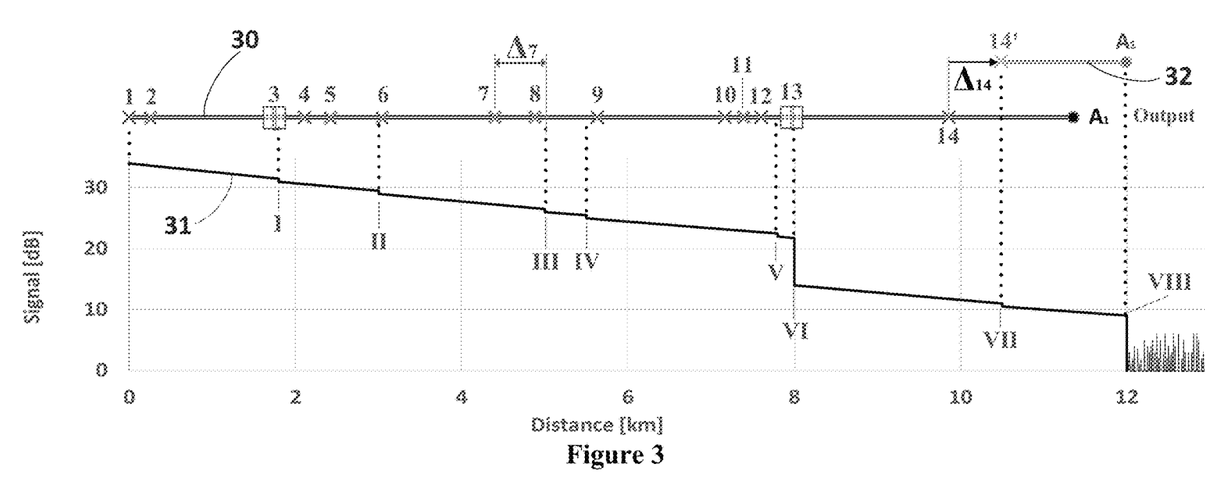
FIG. 3 is a visual representation of the initial matching process used to compare the OTDR measurement to the GIS of the network branch and extrapolate which of the reflectometry's events can be matched to the nearest junction of the corresponding network.

As someone skilled in the art would recognize, non-negligible signal loss (OTDR events) is normally present for a limited number of the network elements (junctions), since the events are only produced by imperfect junctions which are responsible for the signal loss. In other words, there are normally significantly fewer signal loss events than there are network elements since most connections are well done and induce negligible signal loss. Therefore, it is nontrivial to successfully identify the source of signal losses using the erroneous lengths of the database when trying to match the positions of the OTDR events with a few subsets of elements from the GIS of the corresponding branch (span). FIG. 3 illustrates the span of the branch $A_1$ generated by arranging, ordering and adding the lengths of the various span's segments stored in the database used to generate the linear visual representation 30 of the branch $A_1$ of FIG. 1 and the corresponding to the OTDR trace 31 of FIG. 2. While all fifteen elements (1 to 14 and output) of this embodiment's branch are illustrated, only eight events (I to VIII) can be distinguished on the OTDR trace 31.

After matching the initial positions, by lining up the first element of the branch (splice 1) with the start of the trace, it is obvious that the following network elements 3 and 6 are the source of, and can be matched to, the trace events I and II respectively. In this embodiment, these first matches are possible due to relatively accurate database lengths which allows the gaps between the database position and the trace distance to be negligible. However, the matching process becomes much more complex when one or more network elements can possibly correspond to the trace event. For example, in this embodiment, the initial matching of the events with their nearest junction would evidently match the junctions 8, 9, 12, 13, 14 and output with the events III, IV, V, VI, VII and VIII, respectively. Note that a major gap $\Delta_{14}$ referred to as a correction gap is needed to fit and match the event VII with its closest neighboring junction 14 and that the end of the span $A_1$ can then be matched with the end of the OTDR measurement VIII without requiring an additional correction gap. Segment 32 illustrates the adjusted positions of splice 14 and the output $A_1$ when considering the correction gap $\Delta_{14}$ to adjust the length of the previous segment.

In some embodiments, the fitness F of the matching solutions is most importantly based on the sum of the absolute value of the difference between the database position of the junctions and the position of their respectively matched event, here referred to as gaps. The smaller the sum of the absolute values of the gaps, the better the solution's fitness. Though many various fitness equations may be suitable, the equation of F may favor a solution that may require a larger correction gap to reduce the rest of the gaps. For example, a least-squares fitting may not be suitable since it can penalize the use of a single larger gap. In some embodiments, the gaps smaller than a selected tolerance to make up for some of the lesser uncertainties may be neglected when calculating the solution fitness. For example, this may avoid considering a gap smaller than the uncertainties of the OTDR event positions due to an inconsistent or imprecise refractive index of the various optical fiber segments of the span.

Figure 4:
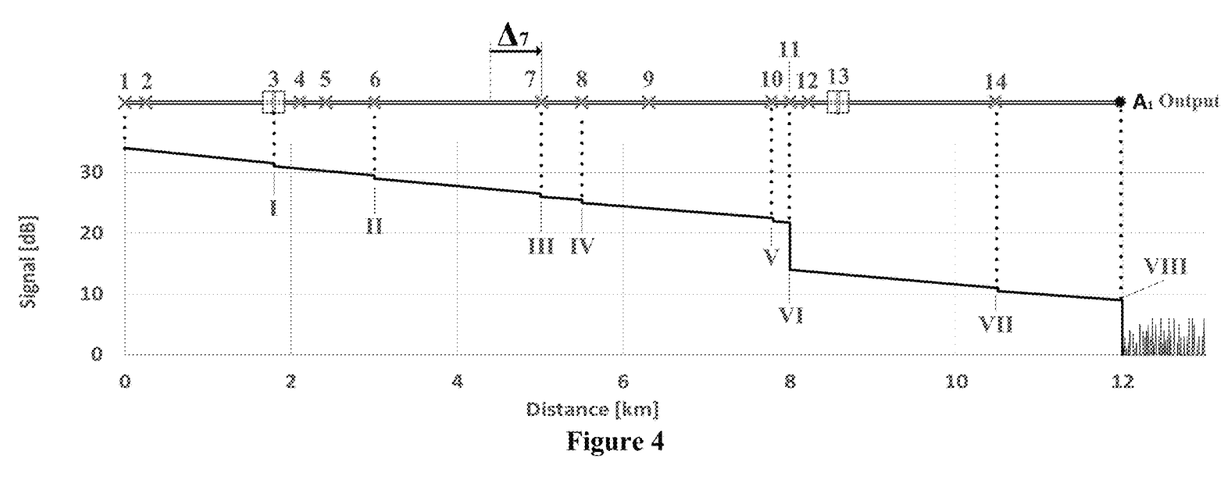
FIG. 4 is a visual representation of the optimal solution generated using the matching optimization process and corresponding to the real specifications of the span's segments length.

In the example of FIG. 3, the initial matching presented could probably be considered as the optimal solution, since the matching of the events can be completed with the addition of a single gap $\Delta_{14}$, when in fact the actual optimal matching solution with the best corresponding fitness is obtained with a various matching arrangement. The optimal solution for this example is illustrated at FIG. 4, where the correction gap $\Delta_7$ corresponding to the actual erroneous length of the database allows to generate the optimal matching solution by using this correction gap $\Delta_7$ to adjust the length of the preceding OF segment to correct the position of the junction 7 and therefore adjusting the position the following junctions. Note that, even if the absolute value of the correction gap $\Delta_{14}$ of the initial match is slightly smaller, this correction gap $\Delta_7$ is identified by the matching optimization algorithm as the optimal solution with the associated best fitness F since correcting the length of the segment preceding the junction 7 allows to better match the following events with the associated junction with smaller corresponding gaps which give the best fitness by minimizing the sum of the absolute value of gaps in the end. Some embodiments comprise an additional matching optimization process able to identify and generate this optimal solution even when the previous solution has a good fitness and seems to be the best. This matching optimization comprises an iterative algorithm that tries matching events with various junctions, even with non-neighboring junctions, and evaluates the associated fitness. Once this iterative process is completed, the solution with the best fitness is kept as the optimal solution. In some embodiments, the algorithm for the optimization matching process is a modified version of the metaheuristic search method TABU search.

Figure 5:
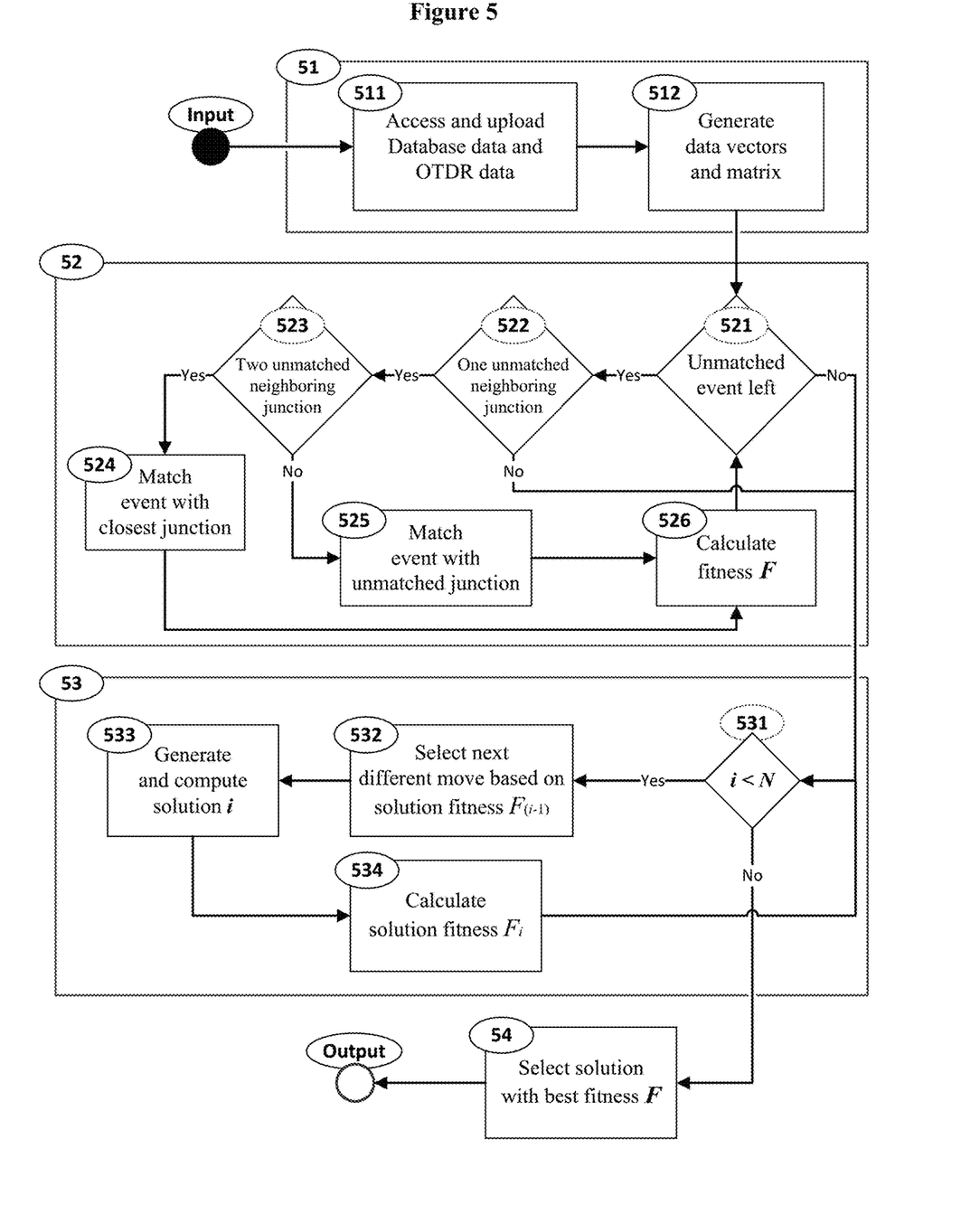
FIG. 5 is a flowchart of the matching algorithm used to complete the initial matching OTDR events with span junctions and the iterative matching optimization for determining the optimal matching arrangement solution.

In some embodiments, the algorithm used in the matching process can be as summarized in the flowchart presented in FIG. 5 and comprising the three main steps; the environment setup and data formatting 51 to extract and standardize the format of the relevant data for the following steps, the initial matching 52 for matching events with their closest neighbors, and the matching optimization 53 for generating the best matching arrangement solution. In this embodiment N is the number of possible alternative solutions, $i \in [1, N]$ is the current iteration indicator and the quality of the solutions is calculated with the following fitness equation F where n is the number of matched events and $g_e$ is the gap for matching event e.

$$F = |n| - \ln \sum_{e=1}^{n} |g_e|$$

In some embodiments, when the gap is too great to allow for initial matching, the distance between a network element (junction) and the OTDR events is calculated for each one of the junctions and these distances are compared for each of them to try to match at least a pair of them. When a match (identification of two similar distances) is complete, this distance is used as a correction gap to correct the database data of the first junction presenting this gap and to try to achieve initial matching for the junctions and event positions. This correction gap is kept if this initial matching works and other correction gaps may be used if this initial matching fails with this first correction gap.

Figure 6:
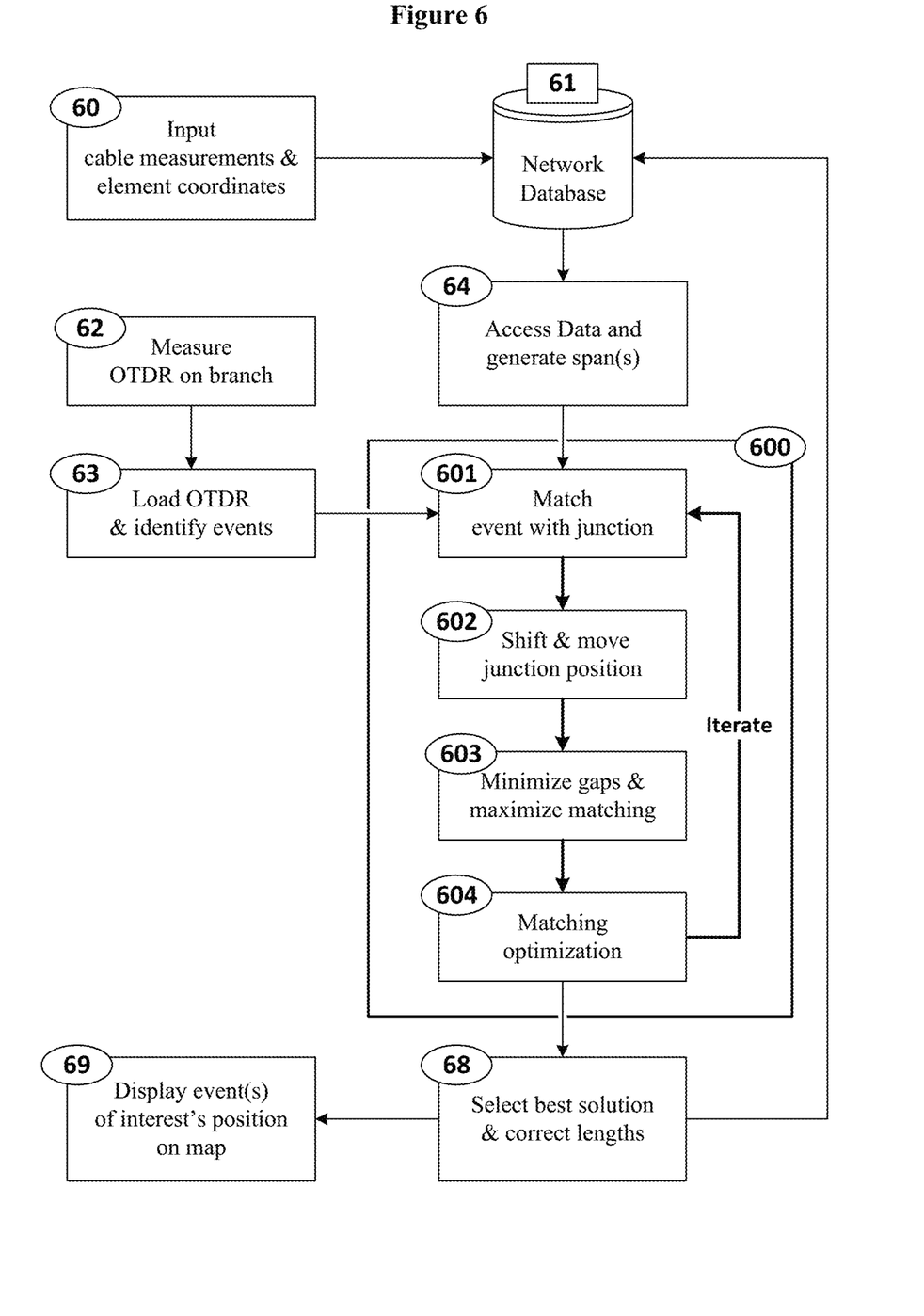
FIG. 6 is a block diagram of the main steps of the method that uses erroneous database data, an OTDR measurement and an automated algorithm to correct the database data and to find the location of a source of an abnormality of the span.

FIG. 6 is a block diagram of the main steps of one embodiment of the method for determining the most likely position of a signal loss occurrence (event of interest) in an optical fiber network. Some embodiments require connectivity to the network database 61 compiling previously measured and inputted specifications of the optical fiber network (step 60) and to the OTDR measurement 63 to access the required data. This connectivity is necessary to ensure efficient searching, uploading, sorting and processing the required data, especially in most cases where the database is disorganized, jumbled and/or cryptic in addition to being specific for each provider. Note that the database structure can change with the year of installation of the optical fiber or with the tendered installation company and is significantly different for the inside of buildings. Some embodiments are comprising an additional automated program and/or algorithm (step 51 of FIG. 5 and step 64 of FIG. 6) used to efficiently generate the span of one or more of possible alternative network branches and also to standardize the format of the data. Once the span is generated and the format of the associated data is standardized, the following integrated matching process 600 may involve the iterative steps 601, 602, 603 and 604 used to optimize the quality of the match with a minimal correction to the initial database data (minimal total of matching gaps) needed to complete the matching process of most of the OTDR events as previously described. The optimal solution, the one with the best fitness F out of all the possible solutions of the matching process 600, is selected and the associated gaps are used to correct the length of the segments of the span (step 68), display the matched events on a map 69 and correct the database data when allowed or save them as metadata when the database access is limited.

Some embodiments can be used to locate the position of an event of interest of an OTDR measurement completed on a network without a specified corresponding branch. This is useful when the specific span of the branch associated with the OTDR measurement cannot be identified within all the possible branches of the database when the data of the connection information between these branch segments are unspecified or erroneous. At a branching junction comprising at least three optical fiber segments (junctions with couplers for example), the connection information data specifies which of the optical fiber segment is connected or spliced to which of the other optical fiber segments present at a given junction. In other words, the connection information data should specify to which following branch an optical fiber is connected, but in some cases, it is either not found or non-existent (unspecified) and/or inexact (erroneous). To identify the span corresponding to the OTDR measurement, some embodiments first generate a span for each of the possible branches, from the OTDR reflectometer position (OTDR input) to the ends of the branches, with the DB data at step 64. For the example of FIG. 1, a list of the four alternative spans would be required, including each of the possible branches; $A_1, A_2, A_3$ and B. The generated spans with a number of junctions smaller than the number of OTDR events (j<e) are rejected and the rest are qualified and individually processed in the matching process 600. In some embodiments, this last filtering process is included within the matching process 600. For the example of FIG. 1 with the OTDR trace of FIG. 2, while all of the A spans would be processed (j>e), the span of branch B with seven junctions (1, 2, 3, 16, 17, 18 and the output B) would be rejected since there are eight events on the OTDR trace 20 (7<8). Once all of the qualified spans are processed, the best solution for each of them are compared to select the solution with the best fitness F (step 68) and the event of interest's most likely position is located (step 69).

In some embodiments, the access to the database is limited to the data extraction and does not allow modifying its data for various reasons including information security. In those cases, the gaps are saved as metadata in the user's device and/or a dedicated alternative network correction database accessible from any device for using the presented method. These metadata are then used to correct the associated network database data when they are used once more in the same or an alternative case.

Figure 7:
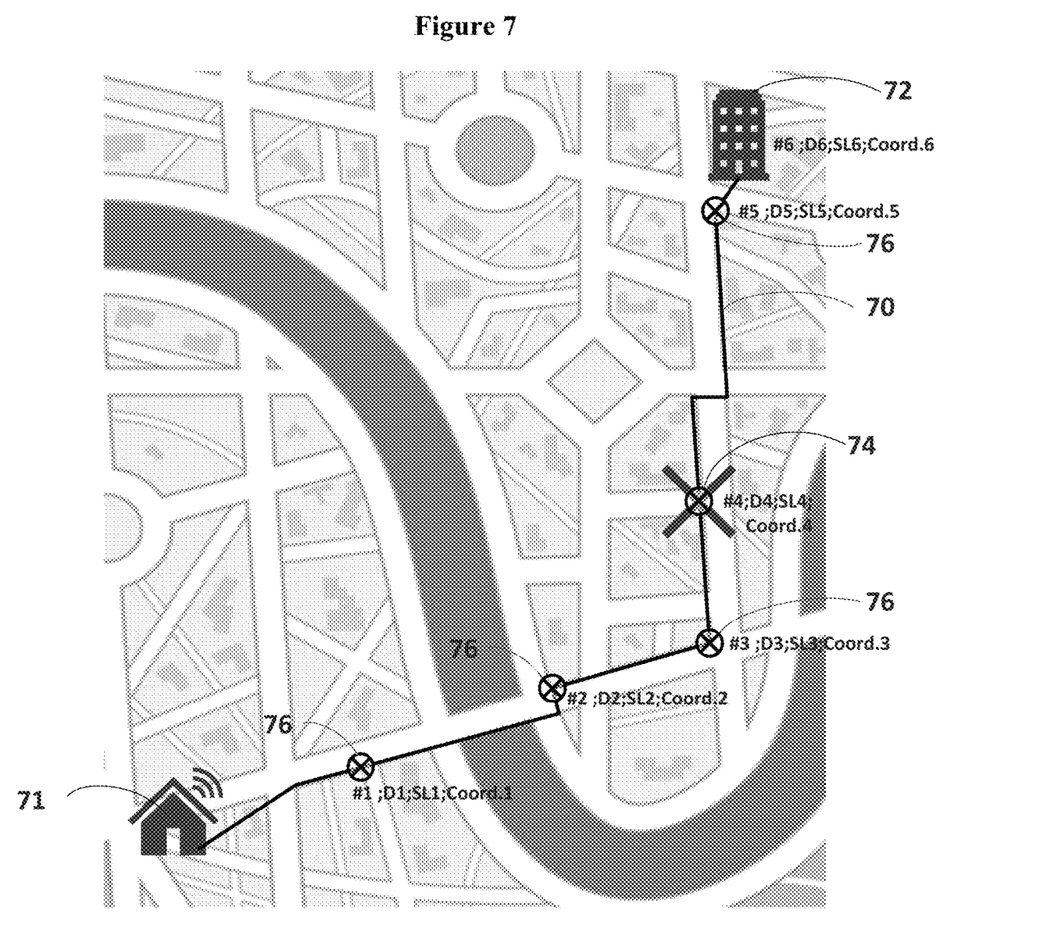
FIG. 7 illustrates a possible result of the method where the most likely position of a fault and its associated optical fiber span connecting a service provider and a service subscriber are displayed on a map to help guide the dispatched maintenance team to rapidly pinpoint the real position.

FIG. 7 illustrates an example of a map of an optical fiber route 70 connecting a provider center or central office 71 and a subscriber's building 72, where the span junctions matched with events are identified with circles 76 and where the most likely position of an event of interest is indicated with a X mark 74. The optical fiber route displayed on the map can be generated with an application or program by combining the geographic information of the branch elements, the correct lengths of the branch segments, a map of the concerned area and the results of the method. In some embodiments, where there is more than one possible location for the fault, the coordinates of the event of interest's most likely position and alternative possible positions are also displayed. In some embodiments, all the junctions matched with an event e are displayed on the map with their distance from a starting point (De), their associated signal loss (SLe) and respective coordinates (Coord.e). In some embodiments, the map is an interactive map that can display the possible itineraries to get to a selected location.

Figure 8:
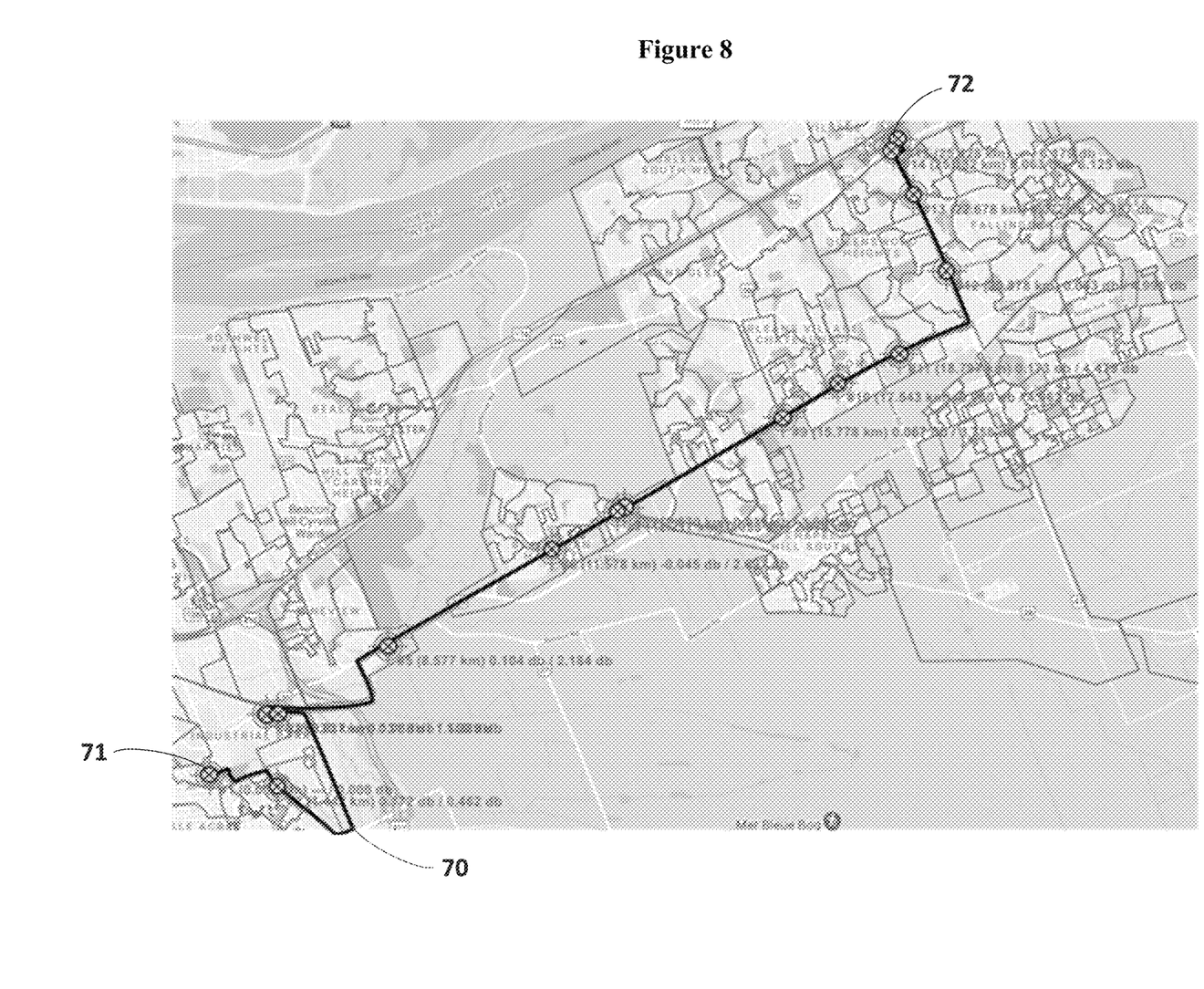
FIG. 8 is an example of an actual result of the method that shows a map displaying an optical fiber route and the junctions matched to events, where the loss per junction and cumulative loss are also displayed.

FIG. 8 is an example of an actual optical fiber route 70 connecting a provider center 71 to a subscriber 71 displayed on a map where the events are mapped to junctions (connectors or splices) along the route and where the loss per junction and cumulative loss are displayed.

In some cases, it may not be possible to find singular possible positions for the fault location, but the method can still be used to significantly narrow down the possible junctions or optical fiber segments that may be the source of the problem which would still greatly help in dispatching the maintenance team and significantly speed up the searching and investigation in the field.

The OTDR measurement can be made at other junctions of the network, not necessarily at one of the branch ends. Therefore, embodiments can be programmed to be installed on a portable device equipped with readable memory, a processor, a display and access to the required data to use an additional OTDR trace by simply identifying the junction and the optical fiber on which the OTDR measurement was taken and the direction of the measurement signal: upstream (toward the provider) or downstream (toward the subscriber). This can allow the fault position to be further narrowed down or pinpointed by the maintenance team while investigating in the field.

In some embodiments, when the event of interest of the primary OTDR trace is not sufficient or the events are not numerous enough for narrowing down fault position, the OTDR reading of other branches sharing at least the span comprising the event of interest can be used to narrow down the possible location of the fault. In this embodiment, one or more additional events may be detected on these new OTDR measurements and used to help increase the identification of associated gaps to better correct the database data, thus better narrowing down the possible position of the fault.

What is claimed is:

1. A method for identifying a location of a reflection event in an optical fiber span, the method comprising:
    accessing database data representing lengths of optical fiber segments separated by junctions forming said optical fiber span, said junctions including a termination of said optical fiber span, said database data containing a data entry error in one of said lengths of said optical fiber segments that places one of said junctions beyond a nearest neighboring one of said junctions;
    accessing optical time-domain reflectometry measurement data of said optical fiber span comprising a plurality of reflection events fewer than a number of said optical junctions, said reflection events corresponding to said junctions;
    estimating a set of gaps between a position of each one of said reflection events and a corresponding one of said optical junctions using an optimization to minimize a total of said set of gaps;
    wherein said optimization includes evaluating gaps between said position of at least some of said reflection events and a non-neighboring one of said optical junctions according to said database data to provide an estimate of said set of gaps that corrects for said data entry error;
    using said set of gaps to provide said location of said one of said reflection event wherein said optical fiber span shares one or more of said junctions with alternative network branches, wherein the connection information data of said shared junctions is undefined or erroneous in said database data and cannot be used to confidently identify the route of said optical fiber span;
    wherein said accessing database data representing lengths of optical fiber segments separated by junctions forming said optical fiber span further comprises accessing database data representing lengths of optical segments separated by junctions forming all possible spans, wherein each one of said possible spans corresponds to one of said alternative network branches;
    wherein said estimating a set of gaps is repeated for each one of said possible spans, wherein said set of gaps for said each one of said possible spans are compiled in a list of sets of gaps; and
    wherein said using said set of gaps to provide said location of said one of said reflection events further comprising selecting a smallest total of said set of gaps out of said list of sets of gaps, wherein said smallest total is used to identify said optical fiber span and provide the route of said optical fiber span of said optical time-domain reflectometry measurement data.

2. The method according to claim 1 wherein the end of said optical time-domain reflectometry measurement data is different from said termination of said optical fiber span, wherein said end of said optical time-domain reflectometry measurement data is induced by a cut on one of said optical fiber segments of said span, and said location of said one of said reflection events is at said cut.

3. A device for identifying a location of a reflection event in an optical fiber span, the device comprising: a processor; and a non-transitory memory readable by said processor, wherein said memory stores program instructions that perform the method defined in claim 2 when executed by said processor.

4. The method according to claim 1 wherein said set of gaps are used to correct said lengths of optical fiber segments of said database data.

5. A device for identifying a location of a reflection event in an optical fiber span, the device comprising: a processor; and a non-transitory memory readable by said processor, wherein said memory stores program instructions that perform the method defined in claim 4 when executed by said processor.

6. The method according to claim 1 further comprising providing a map of said optical fiber network and displaying said location of said one of said reflection events on said map.

7. A device for identifying a location of a reflection event in an optical fiber span, the device comprising: a processor; and a non-transitory memory readable by said processor, wherein said memory stores program instructions that perform the method defined in claim 6 when executed by said processor.

8. The method according to claim 1 wherein the optical fiber span comprises a plurality of branches interconnected by couplers, said accessing optical time-domain reflectometry measurement data of said optical fiber span includes accessing data for said plurality of branches, said one of said reflection events is located on a first one of said plurality of branches, and said comparing comprises using one or more other ones of said reflection events from a second one of said plurality of branches.

9. A device for identifying a location of a reflection event in an optical fiber span, the device comprising: a processor; and a non-transitory memory readable by said processor, wherein said memory stores program instructions that perform the method defined in claim 8 when executed by said processor.

10. A device for identifying a location of a reflection event in an optical fiber span, the device comprising: a processor; and a non-transitory memory readable by said processor, wherein said memory stores program instructions that perform the method defined in claim 1 when executed by said processor.

11. A method for identifying a location of a reflection event in an optical fiber span, the method comprising:
    accessing database data representing lengths of optical fiber segments separated by junctions forming said optical fiber span, said junctions including a termination of said optical fiber span, said database data containing a data entry error in one of said lengths of said optical fiber segments that places one of said junctions beyond a nearest neighboring one of said junctions;
    accessing optical time-domain reflectometry measurement data of said optical fiber span comprising a plurality of reflection events fewer than a number of said optical junctions, said reflection events corresponding to said junctions;
    estimating a set of gaps between a position of each one of said reflection events and a corresponding one of said optical junctions using an optimization to minimize a total of said set of gaps;
    wherein said optimization includes evaluating gaps between said position of at least some of said reflection events and a non-neighboring one of said optical junctions according to said database data to provide an estimate of said set of gaps that corrects for said data entry error;
    using said set of gaps to provide said location of said one of said reflection event; and
    when said database data cannot be corrected, saving said set of gaps as metadata, and said metadata is used to correct said lengths of optical fiber segments of said database data when accessing said database data of one or more of the same said lengths of said optical fiber segments.

12. The method according to claim 11 wherein said optimization comprises:
    calculating a plurality of first distances between said position of said one of said reflection events specified by said optical measurement data and positions of said junctions of said database data;
    calculating a plurality of second distances between a position of one or more other ones of said reflection events specified by said optical measurement data and positions of said junctions of said database data;
    using a common one of said first distances and said second distances to find said non-neighboring one of said optical junctions.

13. A device for identifying a location of a reflection event in an optical fiber span, the device comprising: a processor; and a non-transitory memory readable by said processor, wherein said memory stores program instructions that perform the method defined in claim 12 when executed by said processor.

14. A device for identifying a location of a reflection event in an optical fiber span, the device comprising: a processor; and a non-transitory memory readable by said processor, wherein said memory stores program instructions that perform the method defined in claim 11 when executed by said processor.

15. A method for correcting database data of an optical fiber span, the method comprising:
    accessing database data representing lengths of optical fiber segments separated by junctions forming said optical fiber span, said junctions including a termination of said optical fiber span, said database data containing a data entry error in one of said lengths of said optical fiber segments that places one of said junctions beyond a nearest neighboring one of said junctions;
    accessing optical time-domain reflectometry measurement data of said optical fiber span comprising a plurality of reflection events fewer than a number of said optical junctions, said reflection events corresponding to said junctions;
    estimating a set of gaps between a position of each one of said reflection events and a corresponding one of said optical junctions using an optimization to minimize a total of said set of gaps;
    wherein said optimization includes evaluating gaps between said position of at least some of said reflection events and a non-neighboring one of said optical junctions according to said database data to provide an estimate of said set of gaps that corrects for said data entry error;
    using said set of gaps to correct said lengths of optical fiber segments of said database data; and
    when said database data cannot be corrected, saving said set of gaps as metadata, and said metadata is used to correct said lengths of optical fiber segments of said database data when accessing said database data of one or more of the same said lengths of said optical fiber segments.

16. A device for identifying a location of a reflection event in an optical fiber span, the device comprising: a processor; and a non-transitory memory readable by said processor, wherein said memory stores program instructions that perform the method defined in claim 15 when executed by said processor.

* * * * *